Patented Apr. 14, 1931

1,801,189

UNITED STATES PATENT OFFICE

HEINRICH BERTSCH, OF CHEMNITZ, GERMANY, ASSIGNOR TO THE COMPANY H. TH. BÖHME AKTIENGESELLSCHAFT, OF CHEMNITZ, GERMANY, A CORPORATION OF GERMANY

PROCESS FOR THE SULPHONATION OF FATTY MATERIALS

No Drawing. Application filed October 18, 1927, Serial No. 227,045, and in Germany November 11, 1925.

This invention relates to a process for the sulphonation of fatty materials, including fats, oils, fatty acids and their esters. Heretofore, such sulphonation processes usually consisted in treating the fatty material with chlorsulfonic acid, concentrated sulphuric acid or with fuming sulphuric acid (containing sulphur trioxide), it being understood that the expression "sulphuric acid" as used in this application is intended to define sulphuric acid which does not contain free sulphur trioxide in the absence of a definite statement to that effect.

According to this invention, valuable products are obtained by the treatment of the material with the sulphonating reagent in the presence of an organic acid radical compound, this term including the anhydrous acid, the acid anhydride or the acid chloride. The term organic acid includes aliphatic acids and also aromatic acids. The products obtained by this improved process are considerably better able to resist acid than are the sulphonation products hitherto obtained. As compared with ordinary Turkey red oil the product obtained dissolves clear in 2% sulfuric acid, and in water of 20° hardness no lime soap separates out. The product is furthermore soluble in 20% magnesium (Epsom salt) sulfate solution without any curdy magnesia salts being precipitated. Ordinary Turkey red oil does not stand any of these tests.

The temperatures maintained during the sulfurization lie below 15° C., usually at 0°.

In carrying out the process, it makes no difference whether the organic acids, their anhydrides or chlorides be added to the material to be sulphonated at the same time as, or before, the sulphuric acid is added.

Further, according to this invention, the process is improved by the employment of quantities of organic acid medium equal in weight to the quantities of fatty material to be sulphonated.

The following is one practical example of a process in accordance with these improvements:— 100 Kgs. of castor oil are mixed with 30 Kgs. of acetic acid anhydride and the mixture is treated with sulphuric acid 66° Bé., in the usual manner for sulphonating. Thus, 100 Kgs. of concentrated sulphuric acid may be used and the sulphonation may be carried out with cooling. After the reaction, the reaction mixture is diluted with about 200 liters of water which takes up the excess acetic acid and sulphuric acid still contained in the product, a diluted solution of sulphuric acid and of acetic acid in water being formed. After removing the diluted acid, the product is soluble in water whereas it is insoluble in diluted acids and salt solutions. The washed fatty material is then neutralized and yields a product having the characteristics hereinbefore mentioned.

The treated material may be neutralized immediately, if desired, by the addition of a soda solution for example. Two layers then form of which the upper layer contains sulphurized oil and the lower dilute sulphuric-acid layer contains sodium salts, acetate and sulphate produced by the neutralization. The layers are suitably separated in order to obtain the product aforesaid.

In the practical example given above, the quantities employed provided for substantially one molecule of acetic anhydride per one molecule of fatty material. Such an amount of organic acid anhydride may be said to suffice for binding the water produced in the esterifying process and preventing resaponification. Sulphonation may be carried out in this manner without, in effect, leaving any residue. This invention, however, also provides for obtaining sulphonation products possessing materially different or enhanced properties by considerably increasing the quantities or relative proportions of the organic chlorides or anhydrides employed. Thus, if acetic acid anhydride be employed, the relative proportions may be as large as equal parts by weight of acetic acid anhydride and castor oil.

It has been ascertained that with the process as last described materially more sulphuric acid is chemically combined and products are obtained which correspond comparatively in their action to the monovalent or polyvalent sulpho acids substituted in the benzene ring.

The products so obtained, similarly to the above-mentioned aromatic sulphonated sulpho acids may be used for textile and other purposes because their lime and magnesia salts are soluble in water and they cannot themselves be separated from their acids. Also these products are suitable for use as dispersion agents for converting substances insoluble in water, (such as, for instance, hydrocarbons, halogen hydrocarbons, higher cyclic and heterocyclic bases) into solutions, pseudo solutions or emulsions. The said sulphonated products may also be employed as direct cleansing agents either alone or as additions in cleansing operations such as washing, scouring, bleaching and the like. Due to their considerable wetting and penetrating qualities, the said products may be used in all cases where it is required to effect the penetration of material permeable with difficulty, such as felt, leather and the like and to cause a treating agent to pass into the whole cross section of the material. The soaking or penetrating capacity makes these products suitable for application in all cases where it is a question of readily soaking or permeating surfaces which can only be wetted by aqueous liquids with difficulty, such as metal surfaces, pulverized substances, dye-stuffs and the like. The free acids and their salts, discussed in the preceding pages foam or froth so that they may be employed equally well as forming agents in acid, neutral or alkaline solutions. It is, however, of particular importance to note that the products of this improved process, unlike the aromatic sulpho-acids hereinbefore mentioned, are not salted out by high salt—and/or alkali—concentration (20% magnesium sulfate (Epsom salt) solution or soda liquor at 30° Bé.). This feature renders them valuable as additions to mercerizing liquors and also for the improvement of vegetable fibres when treating them with strong acids. Finally owing to their considerable dispersive effect, the products according to this process are suitable for breaking up or decomposing fats.

It will be understood that the invention is not restricted to the sulfurizing of vegetable oils, fats or their acids, but is intended to include those of animal origin.

For instance, the sulfurizing of oleic acid can be obtained both from vegetable substances such as olive oil as well as from animal substances such as cod liver oil. Therefore both cod liver oil and olive oil as carriers of oleic acid can be subjected to the sulfurizing process of the application.

I claim:—

1. The sulphonation of fatty materials, including fats, oils and fatty acids, consisting in treating said material with concentrated sulphuric acid in the presence of an anhydrous organic acid radical compound.

2. The sulphonation of fatty material, including fats, oils and fatty acids, consisting in treating said material with concentrated sulphuric acid in the presence of acetic acid anhydride.

Dr. HEINRICH BERTSCH.